United States Patent [19]

Nazarian et al.

[11] Patent Number: 4,578,625
[45] Date of Patent: Mar. 25, 1986

[54] SPINDLE DRIVE CONTROL SYSTEM

[75] Inventors: Ara W. Nazarian, Hollywood; Donald G. Stupeck, Canoga Park, both of Calif.

[73] Assignee: Computer Memories, Inc., Chatsworth, Calif.

[21] Appl. No.: 563,958

[22] Filed: Dec. 21, 1983

[51] Int. Cl.[4] .............................................. H02P 5/00
[52] U.S. Cl. .................................... 318/318; 318/314; 318/341; 318/327; 318/317
[58] Field of Search ............... 318/310, 312, 313, 314, 318/315, 317, 318, 326, 327, 329, 345 A, 345 E, 341, 328, 599, 600, 601, 602, 603, 606, 607, 608, 616, 617, 618, 628

[56] References Cited

U.S. PATENT DOCUMENTS

| | | | |
|---|---|---|---|
| 3,532,994 | 10/1970 | Ferrier, Jr. | 318/314 X |
| 3,828,234 | 8/1974 | Goldberg | 318/314 |
| 3,906,319 | 9/1975 | Milligan | 318/341 X |
| 4,197,489 | 4/1980 | Dunn et al. | 318/313 X |
| 4,307,324 | 12/1981 | Regnier | 318/318 X |
| 4,348,585 | 9/1982 | Hoffman | 318/318 X |
| 4,355,266 | 10/1982 | Pearson | 318/314 X |
| 4,360,767 | 11/1982 | Akiyama et al. | 318/318 |
| 4,386,300 | 5/1983 | Ogawa | 318/314 |
| 4,418,307 | 11/1983 | Hoffmann et al. | 318/314 X |
| 4,498,034 | 2/1985 | Shirakawa | 318/314 |

Primary Examiner—Bernard Roskoski
Assistant Examiner—Shik Luen Paul Ip
Attorney, Agent, or Firm—Spensley Horn Jubas & Lubitz

[57] ABSTRACT

Disclosed is a rotational speed control system for comparing the rotational speed of a rotating disk as indicated by index pulses occurring one or more times per revolution of the disk, with a reference time representing the desired time between successive index pulses. The system employs logic circuitry external to any microprocessor control system employed by the rotating disk system. The reference time may be supplied by counters counting externally supplied clock pulses to a fixed value. The speed control system provides a speed up command or slow down command in a manner proportional to the speed error to the disk drive motor where the time between successive index pulses is greater or less, respectively, than the reference time.

8 Claims, 4 Drawing Figures

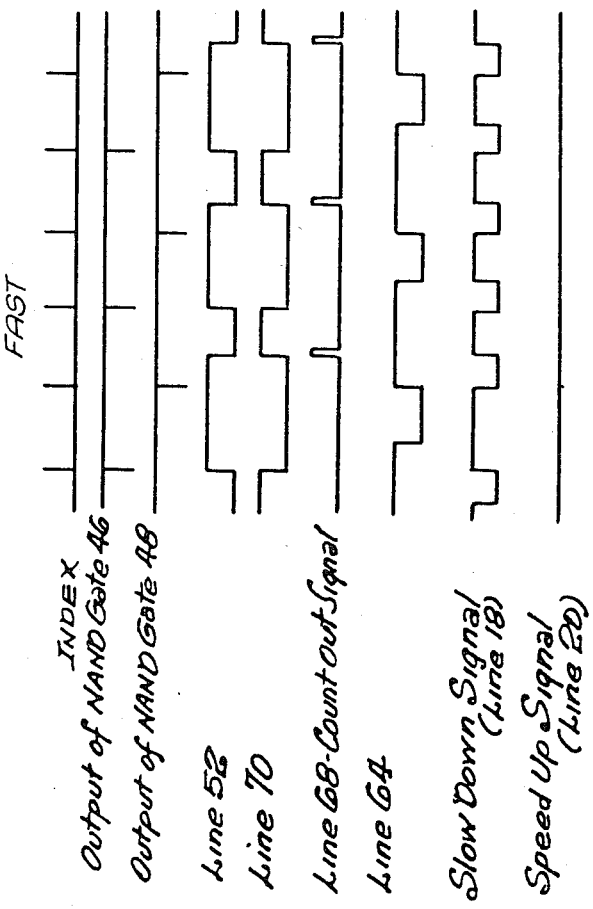

SPINDLE DRIVE CONTROL SYSTEM

BACKGROUND OF THE INVENTION

1. Field of the Invention

This invention relates to rotational speed control systems for rotating members, and in particular, rotational speed control systems for rotating disk memory systems.

2. Background of the Invention

In various applications involving rotating members, and in particular rotating disk memory systems, it is important to maintain the rotational speed of the rotating disk at a specified value.

In many prior art rotating disk memory systems, and in particular in Winchester disk drive systems, the rotational speed of the rotating disk is controlled by a microprocessor which also performs numerous other control functions in the disk drive system. In such systems the microprocessor monitors index pulses derived from rotation of the spindle which supports the magnetic disks and compares the time between successive index pulses to a predetermined time period corresponding to desired rotational speed. The microprocessor thus determines whether the spindle is rotating too fast or too slow and provides appropriate command signals to the spindle drive motor to compensate for the speed error.

Although the monitoring of spindle rotational speed by the control microprocessor is effective, it ties up the microprocessor for a considerable percentage of the available time (commonly as much as one half). Therefore, a larger and more sophisticated and hence correspondingly more expensive microprocessor is required to handle the numerous other control functions along with the spindle speed control monitoring. Alternatively, two microprocessor chips may be required to provide adequate system control as opposed to a single one if the spindle speed monitoring function could be performed externally to the microprocessor.

Prior art approaches to controlling the rotational speed of a rotating member without the use of a microprocessor generally do not provide the high accuracy level of rotational speed control provided by microprocessor systems. A microprocessor control system has the capability of providing a speed up or slow down command to the drive motor after the occurrence of each index pulse and relating the magnitude of the command to the size of the speed error. Accurate speed correction can thus be accomplished for each revolution of the disk (assuming one index pulse per revolution). This type of rotational speed control may be referred to as frequency error detection.

Prior art non-microprocessor controlled speed regulating circuitry, however, does not provide this high accuracy level of error detection. One type of prior art rotational speed control circuit compares externally provided reference pulses with the index pulses and determines whether the index pulses occur before or after the reference pulses based purely upon a phase comparison at each index without resetting the reference counter after each comparison. This method, as frequently practiced in feedback control systems, is well known and generally referred to as a phase locked scheme. Such a scheme, although ultimately accurate, is generally more complex than the frequency dectector based concept of the speed control scheme of the present invention. Factors that render the phase detector scheme more complex include the difficulty of obtaining speed synchronism over a wide range of initial frequency error. While it is further recognized that frequency control schemes are generally well known in the art of control systems, it is the unique useage of the two-counter error detector which constitutes an important aspect of this invention. An example of a phase locked speed control scheme may be seen in U.S. Pat. No. 3,842,326 to Stocker for Velocity Control System for Reel-to-Reel Web Drive.

Some prior art rotational speed error detection circuits which reset the reference pulse for each index pulse lack the capability of giving a magnitude proportional to the speed error, and can only sense the direction of the speed error. Such a rotational speed control system is shown in U.S. Pat. No. 4,243,921 to Tamura et al.

Accordingly, it is an object of the present invention to provide a system for controlling the rotational speed of a rotating member, without utilizing a microprocessor other than for providing a readily available crystal controlled reference clock, which provides rotational speed control based on frequency error detection.

It is a further object of the present invention to provide a rotational speed control system for use with a rotating disk memory system which employs a relatively simple circuit configuration with corresponding low cost.

SUMMARY OF THE INVENTION

The above and other objectives are accomplished in the present invention by providing a system for controlling the rotational speed of the spindle supporting the magnetic disks in a rotating disk memory system which functions externally to the microprocessor controller of the rotating disk memory system. The spindle rotational speed control system employs logic circuitry to compare the time between successive index pulses representative of the rotational speed of the spindle with a reference time representative of the desired time between successive index pulses. In a preferred embodiment, the reference time is supplied by a counter counting externally supplied clock pulses repetitively to a fixed value. The externally supplied clocks would typically emanate from a highly accurate souce such as a crystal via a microprocessor in a manner which does not burden the microprocessor.

The logic circuitry provides a speed up command signal to the spindle drive motor when the time between successive index pulses is longer than the reference time and a slow down signal to the spindle drive motor when the opposite relationship obtains. The time pulse width of the command signals constitute the proportionality aspect of control. The speed up or slow down command may be provided for each successive index pulse by employing two counters which are alternately reset at each index pulse, thereby allowing a reference time to be supplied for each set of successive index pulses.

DESCRIPTION OF THE DRAWINGS

FIG. 3 is a detailed schematic diagram of the preferred embodiment of the speed error detector circuit shown in FIG. 1.

FIG. 4 is a timing diagram showing the timing of the logic implemented in the schematic diagram of FIG. 3.

DESCRIPTION OF THE PREFERRED EMBODIMENT

Figure 1:
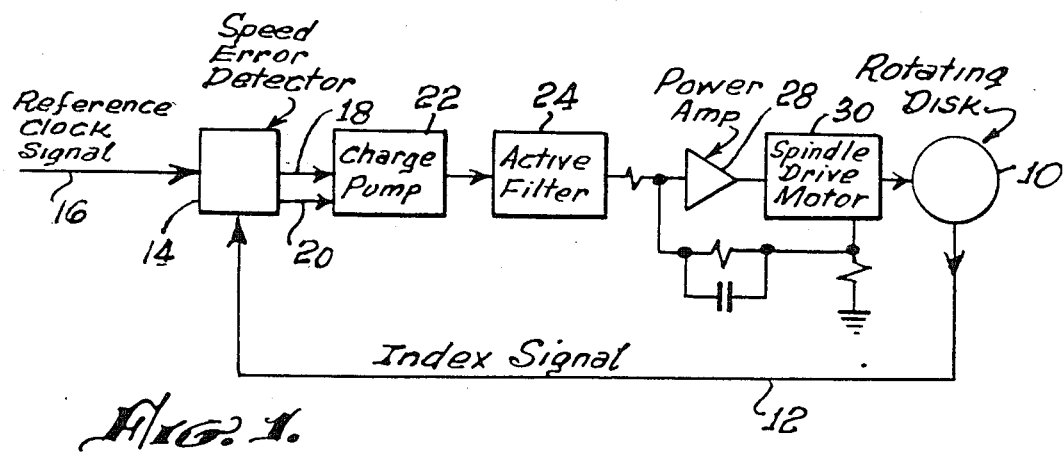
FIG. 1 is a block diagram showing the rotational speed control system of the present invention used in conjunction with a rotating disk system.

Referring to FIG. 1, the preferred embodiment of the rotational speed control system of the present invention is shown in block schematic form connected to a rotating disk 10. Information representative of the rotational speed of the disk 10 is provided in the form of index pulses supplied along line 12. The means for providing the index pulses is well known in the art relating to Winchester disk drive technology and need not be described in detail here. Conceptually, the index pulses may be provided by a method as simple as having a mark on the spindle (not shown) which passes over a detector once per revolution of the disk. Other more complex methods of providing speed reference pulses include schemes of providing multiple index pulses per revolution.

The index pulses supplied along line 12 are provided to the speed error detector circuit 14 which forms a key component of the speed control system. The speed error detector circuit 14 compares the time between successive index pulses (T) with a reference time ($T_o$) which represents the time between successive index pulses when the disk is rotating at the correct speed. In the preferred embodiment, the reference time $T_o$ is supplied by two counters which alternately (upon alternate disk revolutions) count externally supplied reference clock signals to a fixed value. The reference clock signals may be provided by a crystal oscillator or, in a rotating disk memory system, by the clock employed in the microprocessor controlling the operation of the rotating disk memory system. In FIG. 1, the reference clock signal is shown provided to the speed error detector circuit 14 along line 16.

Figures 2A, 2B:
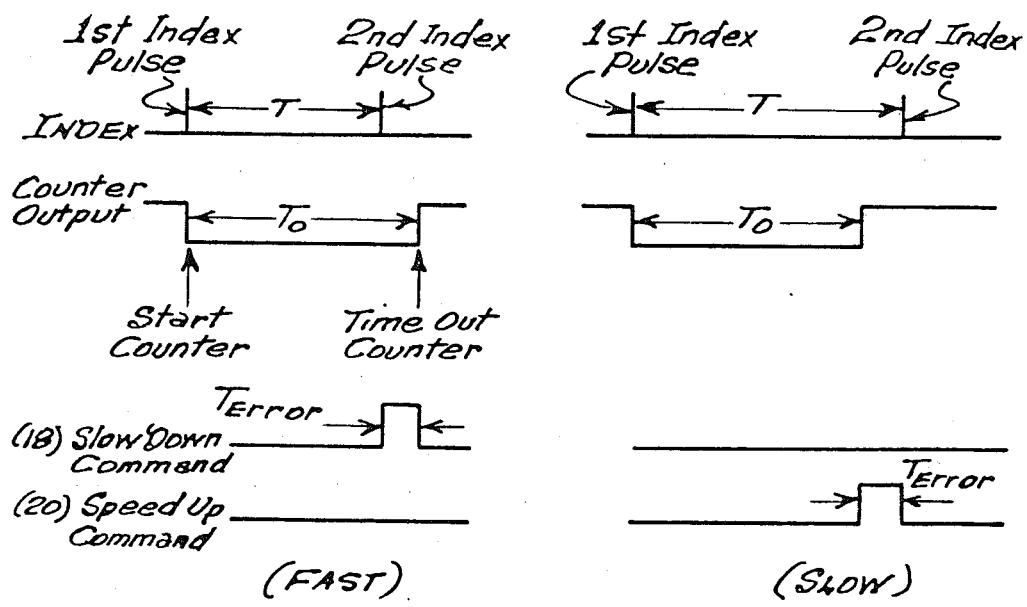
FIG. 2 is a timing diagram showing the basic timing logic implemented in the system of the present invention.
Figure 2:
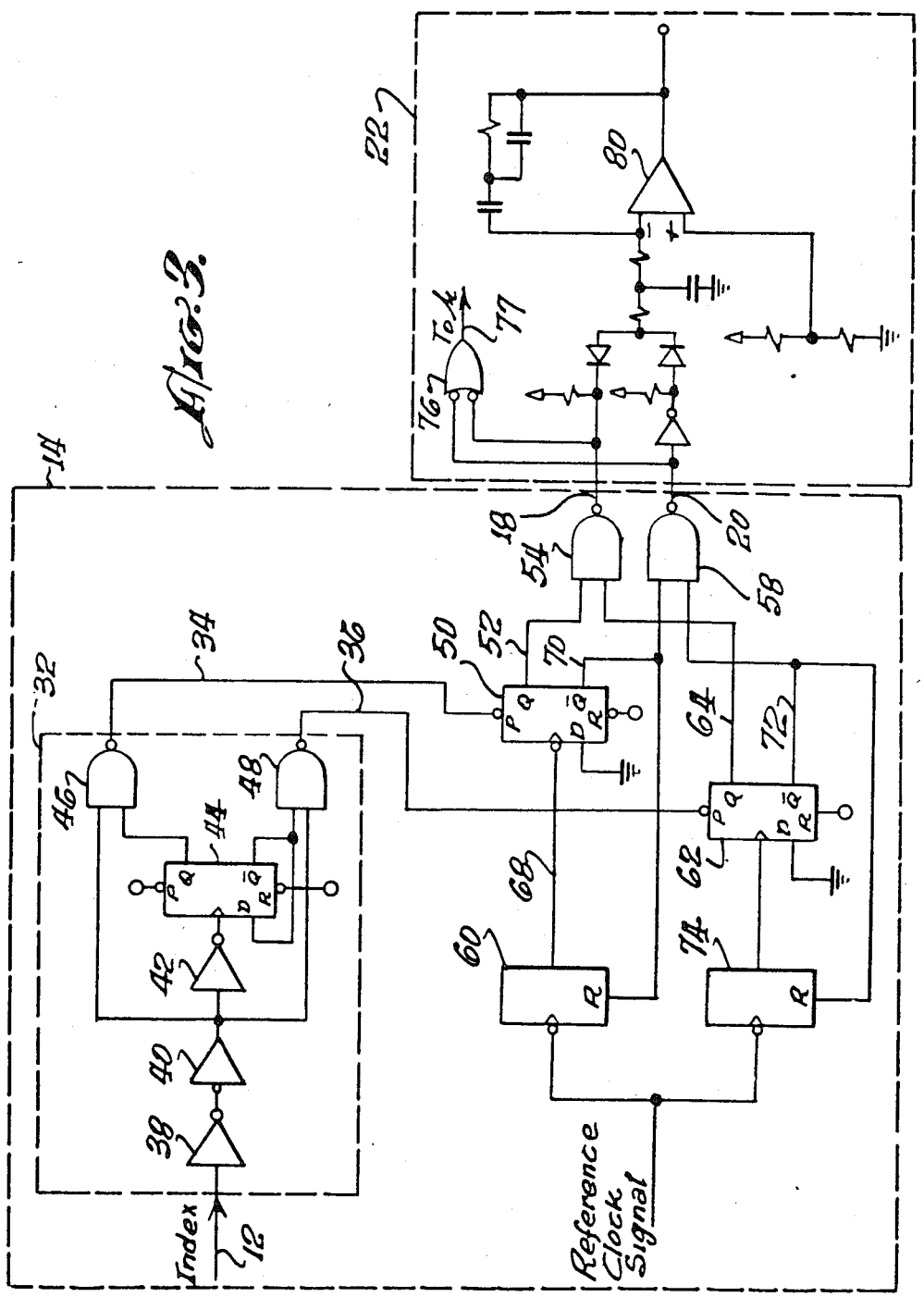

The basic comparison function performed by the speed error detector circuit 14 is shown by the timing diagram of FIG. 2. The speed error detector circuit 14 determines the speed error of the rotating disk 10 by comparing the time between successive index pulses T with the desired or reference time period $T_o$. In FIG. 2(a) the comparison is shown for the situation in which the disk 10 is rotating faster than the desired speed. In this situation, an index pulse received at the speed error detector circuit 14 starts the alternately selected counter which will count for a fixed time period $T_o$ (i.e. up to a predetermined count). The second index pulse is received at the speed error detector circuit 14 prior to the counter's desired count $T_o$ being reached. The time between the receipt of the second index pulse and the counter reaching its desired count $T_o$ constitutes a speed error. The detected speed error is provided as a slow down command on line 18 to the spindle drive motor.

Conversely, FIG. 2(b) shows the situation where disk 10 is rotating too slow. In this situation the alternately selected counter is initiated by an index pulse and reaches its desired count $T_o$ prior to the receipt of the next index pulse (at time T). The speed error detector circuit 14 thus registers a speed error corresponding to the difference between time $T_o$ and time T. The speed error detector circuit 14 then provides a corresponding speed up command at line 20 which is ultimately provided to the spindle drive motor.

Referring again to FIG. 1, the speed up command or slow down command provided by the speed error detector circuit 14 is supplied along lines 18, 20 to charge pump 22. The charge pump serves to convert these digital speed correction command signals, of duration representative of the magnitude of the speed error, to an analog signal. This analog signal represents the accumulated effect of all prior error samples; i.e., the analog command signal reflects an integration process, which is well known within the art of control systems, of all prior error samples as well as the current error sample. The analog speed command signal is then provided to compensator filter 24. The filtered analog speed correction command signal is then applied to a closed loop power amplifier circuit 28 which causes the spindle drive motor 30 to accelerate or decelerate the spindle and disk 10 to compensate for the detected speed error.

FIG. 3 shows a preferred embodiment of the speed error detector circuit 14. As will become apparent, the logic in the speed error detection circuit shown in FIG. 3 provides a relatively inexpensive and effective means for implementing the comparison function outlined in FIGS. 1 and 2.

Referring to FIG. 3, the index pulses representative of the rotational speed of disk 10 are provided along line 12 to a toggle circuit 32. The toggle circuit 32 alternately directs index pulses (at an inverted logic level in this specific choice of logic gates) along lines 34 and 36. The purpose of the toggle circuit 32 is to alternately, upon successive receipt of index pulses at line 12, enable the two counters 60 and 74 within the error detector 14. This toggling function of the toggle circuit 32 may be clearly seen by reference to the timing diagram of FIG. 4 which shows the timing sequence of the logic implemented by the circuit of FIG. 3. As can be seen from a comparison of the top three lines of FIG. 4 the output on lines 34 and 36 correspond to alternate index pulses received along line 12.

The toggle circuit 32 employs first, second and third Schmitt triggers 38, 40, 42 to prevent possible jitter in the signal along line 12 from providing a false index pulse signal. The index pulses received on line 12 are alternately directed down lines 34 and 36 by flip-flop 44 in conjunction with NAND gates 46 and 48. (Flip-flop 44 is a commercially available LS74 D-type flip-flop. It will be appreciated to one skilled in the art that other commercially available flip-flops would be equally suitable with corresponding changes in specific pin-out connections.) Successive index pulses along line 12 cause the output Q of flip-flop 44 to go alternately high and low, and correspondingly, the output $\overline{Q}$ to alternately take the opposite logic value. When the output Q of flip-flop 44 is high NAND gate 46 will output an inverted index signal (low logic level) on line 34 corresponding to the index pulse received on line 12. When the output $\overline{Q}$ of flip-flop 44 goes high (corresponding to the next successive index pulse on line 12) NAND gate 48 will output an inverted index signal on line 36.

Referring to FIG. 4(a) in conjunction with FIG. 3, the comparison function of the circuit of FIG. 3 is described when the disk 10 is rotating too fast and consequently the time between consecutive index pulses is shorter than desired. A first index pulse is provided on line 12 to toggle circuit 32 which outputs an inverted index signal along line 34 to the preset terminal of flip-flop 50 (also a LS74 D-type flip-flop). The output Q of flip-flop 50 goes high and provides a high signal along line 52 to NAND gate 54. As the output Q of flip-flop 50 goes high the output $\bar{Q}$ goes low, thereby providing a low signal on line 70 to NAND gate 58 and the reset terminal of a first counter 60. The low signal on line 70 causes first counter 60 to commence counting. The count rate of first counter 60 is determined by the reference clock signal externally provided on line 16 to counter 60 and the counter 60 is configured to count out at the desired reference time $T_o$ after commencement of counting.

With the disk rotating faster than the desired speed, as shown in the timing diagram of FIG. 4(a), a second index pulse will be received along line 12 by the speed error detector circuit 14 prior to the count out of the counter 60, i.e., prior to expiration of time $T_o$. The next successive index pulse received on line 12 will be inverted at line 36 by toggle circuit 32 and this second toggled index signal will be received at the preset terminal of flip-flop 62 (flip-flop 62 being of identical type to flip-flop 50). Upon receipt of the next index signal flip-flop 62 will have a high signal on its Q output which is provided along line 64 to NAND gate 54. The high signal on line 64 to NAND gate 54 and line 52 being high causes the output of NAND gate 54 to switch from high to low, thereby providing a slow down command signal along line 18. As may be most easily seen by reference to FIG. 4(a), the slow down command signal provided along line 18 continues until counter 60 counts out and provides a count out signal (i.e., reference time signal) along line 68, indicating the elapse of time period $T_o$ from the first index pulse. The count-out signal provided along line 68 to flip-flop 50 causes the output Q of flip-flop 50 to go low, thereby providing a low signal along line 52 to NAND gate 54 which terminates the slow down command signal on line 18. The slow down command signal on line 18 thus is provided for a time period representing the difference between the reference time $T_o$ and the time between a pair of successive index pulses T. Therefore the timing relationship set out in FIG. 2(a) is implemented by the embodiment of the speed error detector circuit 14 shown in FIG. 3.

Referring to FIG. 4(b) in conjunction with FIG. 3 it may be seen that the speed error detector circuit of FIG. 3 also provides the desired speed up command signal when the disk is rotating slower than desired. In such a situation a count-out signal from counter 60 will be provided along line 68 to flip-flop 50 prior to receipt of the second toggled index signal by flip-flop 62. Therefore, the output Q of flip-flop 50 will go low, and the output $\bar{Q}$ will go high, prior to the receipt of the next index signal by flip-flop 62. Flip-flop 62 will have output Q low and output $\bar{Q}$ high until receipt of the second toggled index signal. Therefore, NAND gate 58 will have high level signals provided along lines 70 and 72 from the respective $\bar{Q}$ outputs of flip-flops 50 and 62 and the output of NAND gate 58 will switch from high to low. A speed up command signal will thus be provided along line 20 until receipt of the second toggled index signal by flip-flop 62 causes the output $\bar{Q}$ of flip-flop 62 to go low. This sequence may most clearly be seen by reference to FIG. 4(b). Accordingly the desired comparison function shown in FIG. 2(b) is implemented by the embodiment of the speed error detector circuit 14 shown in FIG. 3.

Reference to FIG. 3 shows that the preferred embodiment of the speed error detector circuit 14 employs two counters, 60 and 74. The provision of two counters allows one of the counters to start counting for each toggled index signal received, i.e. for each index pulse received by the speed error detector circuit 14. This allows provision of a reference time $T_o$ measured from each index pulse for comparison with the next successive index pulse. In other words, the speed error detector circuit 14 may compare times T and $T_o$ for each successive pair of index pulses.

It may be seen that without a second counter a second index pulse might be received prior to the count out signal of the counter. To allow a magnitude of the time error to be indicated by the pulse width of an error signal, however, the counter must be allowed to count out. Therefore, the counter could not be reset and a reference time $T_o$ would not be available for the next successive index pulse. Accordingly, provision of the second counter allows for detection of magnitude of error along with a speed correction signal corresponding to every index pulse.

The slow down command signal and speed up command signal, provided on lines 18 and 20 respectively, are provided (with inverted logic level) to OR gate 76. OR gate 76 will thus provide a speed error signal on line 77 when the disk 10 is rotating too fast or too slow. This speed error signal may be provided to the system control microprocessor (not shown) to determine if the speed error is too great for reliable operation of the system.

The specific implementation of the rotational speed correction in response to the speed up command or slow down command as achieved in the preferred embodiment, employs charge pump 22. The charge pump 22 allows the duration of the digital speed correction command signal to be converted to an analog signal of a magnitude corresponding to the desired speed drive level. The charge pump 22 functions in a manner well-known in the art and need only be briefly described here. The charge pump 22 employs a capacitor 78 which is discharged by a slow down signal on line 18 and charged by a speed up signal on line 20. The degree of charging or discharging will be directly proportional to the duration of the speed up or slow down command signal. The variation in charge on capacitor 78 in turn causes either a positive or negative voltage differential across the two inputs of operational amplifier 80. Referring to FIG. 1, amplifer 80 thus provides a corresponding correctional voltage, via active filter 24, to power amplifier 26 and spindle drive motor 28.

While the present invention has been described in terms of the presently preferred embodiment, it will be appreciated that variations from the above described preferred embodiment are also within the scope of the present invention. For example, although the speed error detector circuit of the preferred embodiment has been described in terms of particular commercially available integrated circuits having specific pin-out connections and logic level responses, a wide variety of different choices of integrated circuits and corresponding inter-connections are possible. Also, while described as part of a rotating disk memory system, the present invention is suitable for control of rotational speed of other rotating systems requiring accurate speed control.

It will be apparent to one skilled in the art that other such changes in the details of the preferred embodiment described above may be made and such alternate embodiments are within the scope of the present invention. Thus, the present invention is not intended to be limited to the above described preferred embodiment and is instead best described by the following claims.

What is claimed is:

1. A rotational speed error detection cicuit responsive to externally provided index pulses of frequency representative of rotational speed of a rotating member, comprising:

toggling means for receiving said index pulses and providing alternate index pulses as first toggled index pulses and second toggled index pulses respectively;

first reference time means coupled to said toggling means for providing a first reference time signal a specified reference time after receipt of each first toggled index pulse;

second reference time means coupled to said toggling means for providing a second reference time signal said specified reference time after receipt of each second toggled index pulse;

logic means responsive to said first and second toggled index pulses and said first and second reference time signals for providing a speed up command signal when the time between successive toggled index pulses exceeds said reference time and a slow down command signal when the time between successive toggled index pulses is less than said reference time, the duration of said command signal being proportional to the magnitude of the difference between the time between said successive toggled index pulses and said reference time.

2. A rotational speed control circuit for use in a rotating disk memory system having a rotating disk, a drive motor, and control system, comprising:

index means for providing an index pulse at least once per revolution of the rotating disk, said index pulses including first index pulses alternating with second index pulses;

first reference time means responsive to every first index pulse for providing a reference pulse predetermined period of time ($T_o$) after the occurrence of said every first index pulse;

second reference time means responsive to every second index pulse for providing a reference pulse said predetermined period of time $T_o$ after the occurrence of said second index pulse;

logic means for comparing a time (T) between consecutive index pulses and the reference time $T_o$ and providing a speed up command signal representative of the difference between T and $T_o$ when T is greater than $T_o$ and providing a slow down command signal representative of the difference between T and $T_o$ when T is less than $T_o$.

3. In a rotating disk memory system having a rotating disk, a drive motor, and a microprocessor control system, the method of maintaining a desired rotational speed of the rotating disk by circuitry external to the microprocessor control system, comprising the steps of:

providing repetitive index pulses representative of the rotational speed of the rotating disk, including first index pulses alternating with second index pulses;

providing a first reference signal for a predetermined duration after each first index pulse;

providing a second reference signal for said predetermined duration after each second index pulse;

comparing the duration of [the] each reference signal with the time period between the index pulse from which the reference time is measured and the next successive index pulse;

providing a speed up command to the drive motor when the reference signal ends prior to said next successive index pulse, said speed up command having magnitude proportional to the time between the end of the reference signal and said next successive index pulse; and providing a slow down command to the drive motor when the reference signal ends subsequent to said next successive index pulse, said slow down command having magnitude proportional to the time between the next successive index pulse and the end of the reference signal.

4. A rotational speed error detection circuit as set out in claim 1 further comprising a source of periodic clock signals having a frequency high in relation to the rotational frequency of the rotating member and wherein said first reference time means comprises a first counter responsive to said source of periodic clock signals for counting said periodic clock signals to a specified value and said second reference time means comprises a second counter responsive to said source of periodic clock signals for counting said periodic clock signals to said specified value.

5. A rotational speed error detection circuit as set out in claim 2 further comprising a source of periodic clock signals having a frequency which is high in relation to the frequency representative of the rotational speed of the rotating member and wherein said first reference time means comprises a first counter responsive to said source of periodic clock signals for counting said clock signals to a value corresponding to a time $T_0$ after occurrence of said first index pulses and wherein said second reference time means comprises a second counter responsive to said source of periodic clock signals for counting said clock signals to a value corresponding to a time $T_0$ after occurrence of said second index pulses.

6. A rotational speed control system for controlling the rotational speed of a rotating disk member, said rotating member having associated therewith means for providing an index signal one or more times per revolution of said member, said member being coupled to a motor for driving the rotation of said member, said speed control system comprising:

means for providing reference clock signals, said clock signals having a frequency high in comparison to the desired rotational frequency of said rotating disk member;

means for receiving said index signal and for providing first index signals alternating with second index signals;

first counter means responsive to said first index signals and said reference clock signals for providing a first reference time signal a predetermined reference time af receipt of a first index signal;

second counter means responsive to second index signals and said reference clock signals for providing a second reference time signal a predetermined reference time after receipt of a second index signal;

means responsive to said first reference time signal and said second reference time signal and said index signal for determining the difference between the time of each consecutive index signal and said predetermined reference time as indicated by said first or second reference time signal, and providing a motor speed error signal proportional to said difference and representative of the timing of said signals;

means responsive to said motor speed error signal for providing a motor speed correct signal to said motor for speeding up said motor in response to a motor speed error signal indicating rotation slower than desired and for decreasing the speed of said motor in response to a motor speed error signal indicating rotation faster than desired.

7. A rotational speed control system as set out in claim 6 wherein said motor speed error signal is provided after each index signal.

8. A rotational speed error detecting circuit for use in controlling the rotational speed of a rotating disk member, said rotating disk member being driven by a motor and said motor having index means associated therewith for providing an index signal representative of the rotational period of said motor, said speed error detecting circuit comprising:

a source of high frequency clock signals;

a first counter coupled to said source of clock signals for counting said clock signals to a predetermined value and providing a first count out signal;

a second counter coupled to said source of clock signals for counting said clock signals to said predetermined value and providing a second count out signal;

a toggling circuit coupled to said index means for providing alternate index signals along first and second lines respectively;

first counter reset means for receiving the index signals provided along said first line and in response to each index signal received outputting a first logic signal having a first logic level and an inverted first logic signal and resetting said first counter to start said first counter counting and for receiving said first count out signal from the first counter and in response to said first count out signal logically inverting the logic level of said first logic signal and said inverted first logic signal;

second counter reset means for receiving the index signals provided along said second line and in response to each index signal received outputting a second logic signal having a first logic level and an inverted second logic signal and resetting said second counter to start said second counter counting and for receiving said second count out signal from the second counter and in response to said second count out signal logically inverting the logic level of said second logic signal and said inverted second logic signal;

first logic gate means coupled to said first counter reset means and said second counter reset means for receiving said first logic signal and said second logic signal and for providing a fast speed error signal when said first logic signal and said second logic signal are at the same logic level;

second logic gate means coupled to said first counter reset means and said second counter reset means for receiving said inverted first logic signal and said inverted second logic signal and for providing a slow speed error signal when said inverted first logic signal and said inverted second logic signal are at the same logic level.

* * * * *